United States Patent
Li et al.

[19]

[11] Patent Number: 6,082,314
[45] Date of Patent: Jul. 4, 2000

[54] MULTIPLE CIRCULAR SLIDER CRANK RECIPROCATING PISTON INTERNAL COMBUSTION ENGINE

[75] Inventors: Ming Li; Zhengzhong Li, both of Beijing, China

[73] Assignee: Liao Ning Daan Internal Combustion Engine Institute, Liaoning Province, China

[21] Appl. No.: 08/983,037

[22] PCT Filed: Jun. 13, 1996

[86] PCT No.: PCT/CN96/00042

§ 371 Date: Jan. 15, 1998

§ 102(e) Date: Jan. 15, 1998

[87] PCT Pub. No.: WO96/41936

PCT Pub. Date: Dec. 27, 1996

[30] Foreign Application Priority Data

Jun. 13, 1995 [CN] China .................................. 95111404

[51] Int. Cl.⁷ .................................................. F02B 75/24
[52] U.S. Cl. .......................................................... 123/55.4
[58] Field of Search ............................... 123/192.2, 55.2, 123/55.3, 54.6

[56] References Cited

U.S. PATENT DOCUMENTS

| | | |
|---|---|---|
| 857,149 | 6/1907 | Beard ...................................... 123/55.3 |
| 1,766,829 | 6/1930 | Myers ...................................... 92/153 |
| 2,223,100 | 11/1940 | Foster . | 
| 3,258,992 | 7/1966 | Hittell . |
| 4,459,945 | 7/1984 | Chatfield ............................... 123/56 C |
| 4,694,785 | 9/1987 | Timmerman et al. ................. 123/52 A |
| 5,067,456 | 11/1991 | Beachley et al. . |
| 5,131,355 | 7/1992 | Bukovics et al. ..................... 123/192.2 |
| 5,331,926 | 7/1994 | Vaux et al. ........................... 123/196 R |
| 5,402,755 | 4/1995 | Waissi .................................... 123/55.3 |
| 5,758,615 | 6/1998 | Kreuter ................................ 123/192.2 |
| 5,778,834 | 7/1998 | Piccinini ................................ 123/55.2 |

FOREIGN PATENT DOCUMENTS

| | | |
|---|---|---|
| 85 1 00358 | 4/1985 | China . |
| 86 2 10915 U | 12/1986 | China . |
| 2076608 U | 8/1990 | China . |

Primary Examiner—Noah P. Kamen
Assistant Examiner—Jason Benton
Attorney, Agent, or Firm—Burns, Doane, Swecker & Mathis LLP

[57] ABSTRACT

The present invention relates to internal combustion engines, particularly to a reciprocating piston type internal combustion engine with a crank and multiple circular slide blocks, formed by substituting connecting rods with circular slide blocks. The engine comprises a crank-and-circular slide block mechanism including a cylinder body, pistons, circular slide blocks, a crankshaft and the like. In the cylinder body, there is a sliding track in which there is a dynamic balance sliding piece. There are at least three circular slide blocks connected into an integral, with the phase difference of the adjacent circular slide blocks being 180°, and the circular slide blocks being rotably received in the pistons or the dynamic balance sliding piece and all being sleeved on the same crank pin. The engine of the present invention has excellent dynamic balanceability and compact configuration; and compared with existing engines of the same type, its size and weight are 30–50% and the man-hour for manufacture is 50–60%, and 70% of the parts are commonly used ones, it is reliable in operation, has long service life and low energy-consumption.

21 Claims, 6 Drawing Sheets

# MULTIPLE CIRCULAR SLIDER CRANK RECIPROCATING PISTON INTERNAL COMBUSTION ENGINE

TECHNICAL FIELD

The present invention relates to internal combustion engines, particularly to a reciprocating piston type internal combustion engine formed by substituting connecting rods with circular slide blocks.

BACKGROUND OF INVENTION

The existing reciprocating piston type internal combustion engines utilize crank connecting rods to achieve the reciprocating motion of pistons. To overcome the existing disadvantages of comparatively complex structure, more reciprocating inertia forces, bulky body, and heavy weight of the crank connecting rod mechanism, there has been invented a crank-and-circular slide block mechanism to substitute for the crank connecting rod mechanism by substituting connecting rods with circular slide blocks, and which is disclosed in CN85100358A entitled "Reciprocating Piston Type Internal Combustion Engine with a Crank and Circular Slide Blocks" invented by the inventor, published in the Gazette of Patents by Chinese Patent Office. This engine is simpler in structure and lighter in weight, and utilizes a circular slide block provided with a gear transmission pair to replace the connecting rod mechanism, but it can only be used for a single-cylinder engine and its dynamic balance is not good enough.

In view of facts, the object of the present invention is to provide a reciprocating piston type multi-cylinder internal combustion engine with a crank and multiple circular slide blocks, which is characterized by simple and compact structure, light weight, excellent dynamic balance, desirable inherent property for conventional components of internal combustion engines and shorter manufacture period.

SUMMARY OF INVENTION

The reciprocating piston type internal combustion engine with a crank and multiple circular slide blocks of the present invention (see attached drawings) comprises a crank-circular slide block mechanism including, pistons, circular slide blocks, a crankshaft, crank and pins; a cylinder body; cylinder heads; a fly wheel; a fuel supply system; a lubrication system; and a cooling system. In the cylinder body there is a slide type sliding track in which there is a dynamic balance sliding piece, and there is at least three the circular slide blocks, connected to form an unit by means of locating pins, with a phase difference of 180° between adjacent circular slide blocks, which are rotatably mounted in holes of the pistons or the dynamic balance sliding piece respectively, and all the eccentric axle-holes in the circular slide blocks are sleeved on the crankshaft.

There may be two cylinders (10,11) arranged in H-shaped parallel to each other; the sliding track (14) may be in the cylindrical cavity shape, located between the two cylinders and being perpendicular to the cylinders, the pistons (15,16) are double-acting pistons, the dynamic balance sliding piece (25) is in the cylindrical shape matching the sliding track, the holes (22,27) are at the middle of the pistons and of the dynamic balance sliding piece and the centerline of the crankshaft (30) is located at the middle of the cylinders and perpendicular to the centerlines of the cylinders and of the sliding track, thus forming a H-type four-cylinder engine.

The sliding track may be a short cylinder located between the two parallel cylinders and being perpendicular to the two cylinders, arranged in such a manner that the sliding track and the two parallel cylinders presents a H-⊥ shaped arrangement, thus forming a H-⊥ type five-cylinder engine with the dynamic balance sliding piece being single-acting piston.

The sliding tracks may be short cylinders located on either side of the two parallel cylinders, arranged in such a manner that the sliding tracks and two parallel cylinders present a H-⊥ shaped arrangement, thus forming a H-⊥ type six-cylinder engine with the dynamic balance sliding pieces being single-acting pistons.

The two parallel cylinders and sliding track there between them may all be short cylinders and may present a V-shaped arrangement, and the pistons and dynamic balance sliding piece are all single-acting pistons each having a hole (59) at one end, and the centerline of the crankshaft (30) is located at the lower ends of the cylinders and sliding track. Thus, a V-type three-cylinder engine is formed.

The circular slide blocks (37,38,39) may be in the flat cylindrical shape with equal outer diameters and equal eccentricities of the holes (40).

The eccentricities of the holes (40) in the circular slide blocks (37,38,39) are identical to the crank radius of the crankshaft (30).

The crank pin (31) of the crankshaft (30) can be included in the space extending between the main journals (32,33) along the centerline to make the crank overlap degree be 100%.

The circular slide blocks (37,38,39) are fixedly connected to form an unit by two locating pins (43,44) symmetrically disposed on both sides of the axle-hole.

The circular slide block (38) mounted in the dynamic balance sliding piece has an axial width twice as large as that of the circular slide block (37,39) mounted in the pistons.

The circular slide blocks (37,38,39) each has an oil passage (47) connected with the axle-hole (40) and the outer cylindrical surface. On the end faces of the circular slide blocks (37,39), adjacent to the crank of the crankshaft there are cross-shaped oil channels (48) connected with the axle-hole (40).

The pistons (15,16) and dynamic balance sliding piece (25) have oil apertures (24,29,62) connected with the holes (22,27) and the guide surfaces (21,26,60), and there are oil channels (23,28,61) on the guide surfaces.

The crankshaft (30) is a single-crank type crankshaft which has only one crank pin, with all the circular slide blocks being mounted on the crank pin (31).

The crankshaft (30) has an oil passage (35) along the crankpin (31) axis and oil apertures (36) connected with the oil passage and the matching surface of the crank pin which matches the circular slide blocks.

The circular slide blocks mounted in the pistons are with the same mass and identical center of gravity positions.

The circular slide block (38) mounted in the dynamic balance sliding piece has the mass equal to the sum of the mass of two circular slide blocks (37,39) mounted in the two double-acting pistons, and its centroid is symmetric to the two axle-hole centers of the two circular slide blocks.

The dynamic balance sliding piece or the dynamic balance sliding piece assembly of a single-acting piston arrangement has the mass equal to the sum of the mass of the two double-acting piston or the two single-acting piston assemblies, and its centroid is on the central axis.

The fly wheel at the end of the crankshaft can have its weight cut down according to static balance in the crank direction.

The pulley at the output end of the crankshaft can be counterweighted according to static balance in the opposite direction in which the fly wheel has its weight cut down.

Figure 1:
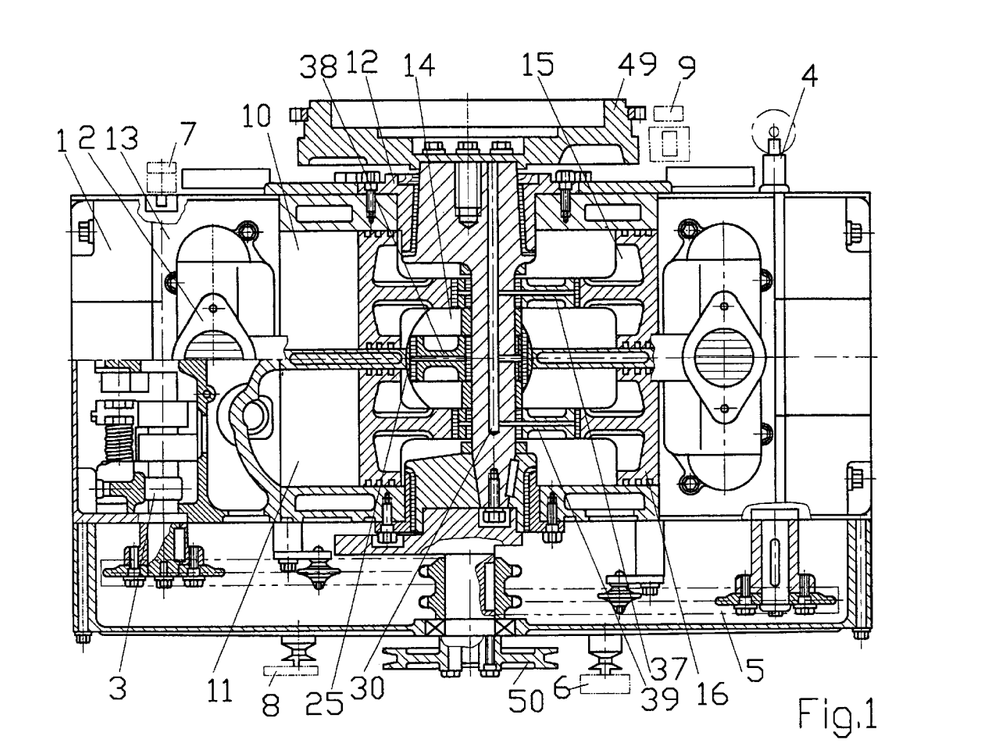
FIG. 1 is a schematic view of the configuration of a reciprocating piston type internal combustion engine with a crank and multiple circular slide blocks of the present invention, showing (as) a H-shaped four cylinder engine.
Figure 2:
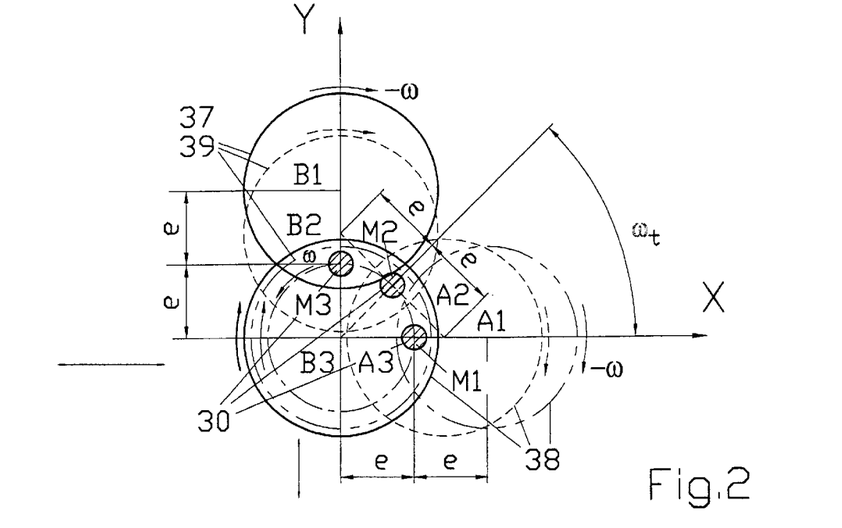
FIG. 2 is a schematic view of the motions of a working circular slide block, a balancing circular slide block and a crank pin of FIG. 1.

The motion principle of the present invention is shown in FIG. 2. It is given that the rotation radius of the center of crank pin, that is, the crank radius, is e; all the circular slide blocks are fixedly connected to form an unit; the axle-holes of all the circular slide blocks are coincident and sleeved on the same crank pin; the eccentricities of all the axle-holes are e; and the phase difference of adjacent circular slide blocks is 180°. Here, the circular slide blocks in the pistons are referred to as working circular slide blocks and the circular slide block in the dynamic balance sliding piece is referred to as balancing circular slide block. When the engine is in operation, the pistons and the working circular slide blocks reciprocate along X axis in the cylinders, and the dynamic balance sliding piece and the balancing circular slide block reciprocate along Y axis in the sliding track; X axis is perpendicular to Y axis. In the figure, M1, M2 and M3 are the displacement points of the center of a crank pin, A1, A2 and A3 are the displacement points of the center of a working circular slide block, and B1, B2 and B3 are the displacement points of a balancing circular slide block. When the crankshaft, together with the crank, rotates at an angular velocity ω, the working circular slide blocks and the balancing circular slide block will rotate oppositely at an angular velocity—ω, while the pistons and the working circular slide blocks ,as well as the dynamic balance sliding piece and the balancing circular slide block, will move sinuoidally and consinoidally. The time for motion is t. When ωt=0, the centers of the crank pin, the working circular slide blocks and the balancing circular slide block are located at points M1, A1 and B1 respectively, as shown by the double-dash dotted line. When the crank pin rotates by ωt angle, the centers of the three components are located at points M2, A2 and B2, as shown by the dash dotted line. When the crank pin rotates to ωt=90°, the centers of the three components are located at points M3, A3 and B3, as shown by the solid line.

The law of motion of a piston can be represented by:
displacement: $S_x=2e(1-cos\omega t)$
velocity: $V_x=2e\omega sin\omega t$
acceleration: $a_x=2e\omega^2 cos\omega t$ The law of motion of a dynamic balance sliding piece can be represented by:
displacement: $S_y=2e(1-sin\omega t)$
velocity: $V_y=-2e\omega cos\omega t$
acceleration: $a_y=-2e\omega^2 sin\omega t$ The law of resultant motion of the piston and the dynamic balance sliding piece can be represented by:

$$\text{Acceleration: } \alpha = \sqrt{\alpha^2 x + \alpha^2 y} = 2e\omega^2$$

$$\text{direction: } \frac{\alpha_x}{\alpha_y} = tg\omega t$$

$$\omega t = \theta = tg^{-1}\frac{\alpha_x}{\alpha_y}$$

Since the rotation angle of the crank θ=wt, the acceleration is directed to the crank pin center from the main shaft center, that is, the resultant acceleration of the piston and the dynamic balance sliding piece is the centrifugal acceleration, and the resultant force in motion is the centrifugal force.

On these grounds, all the various inertia forces of the crank-and-multiple circular slide block mechanism can be converted into a centrifugal force concentrated on the crank pin, therefore, the mechanism can achieve theoretically complete static and dynamic balances just by cutting down the weight of the fly wheel and adding the counterweight to the pulley at the two ends of the main shaft, according to static balance without increasing any special devices.

The operation fashion of the present invention is the same as that of conventional internal combustion engines.

The present invention will be further described with reference to the embodiments and their attached drawings as follows.

PREFERRED EMBODIMENTS OF THE INVENTION

Embodiment 1

The reciprocating piston type internal combustion engine with a crank and multiple circular slide blocks of the present invention, as shown in attached drawings 1, 3, 4, 7, 8 and 11–20, is a H-type four-cylinder engine, comprising a crank-and-multiple circular slide block mechanism including pistons, a dynamic balance sliding piece, a crankshaft, a crank, circular slide blocks, pins, etc.; a fuel supple-system and a valve-actuating mechanism which are conventional construction including an air inlet pipe(s), carburator 2, cam shaft 3 and the like; an ignition system and electric system including an electricity devider 4 and its transmission sprocket 5, generator 6 and the like; a lubrication system including a lubricant pump 7 and the like; a cooling system including a water pump 8 and the like; and a starting device including a starter 9 and the like.

The crank-and-multiple circular slide block mechanism is composed of (cylinders, cylinder heads, a sliding track(s),) pistons, a dynamic balance sliding piece, a crankshaft, a crank, circular slide blocks, pins and the like.

Figure 3:
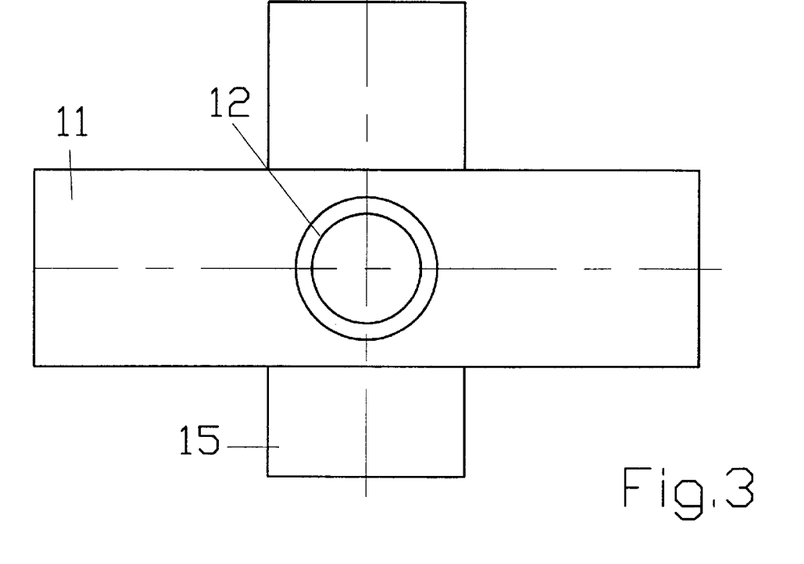
FIG. 3 is a schematic view of the configuration of a cylinder body of FIG. 1.
Figure 4:
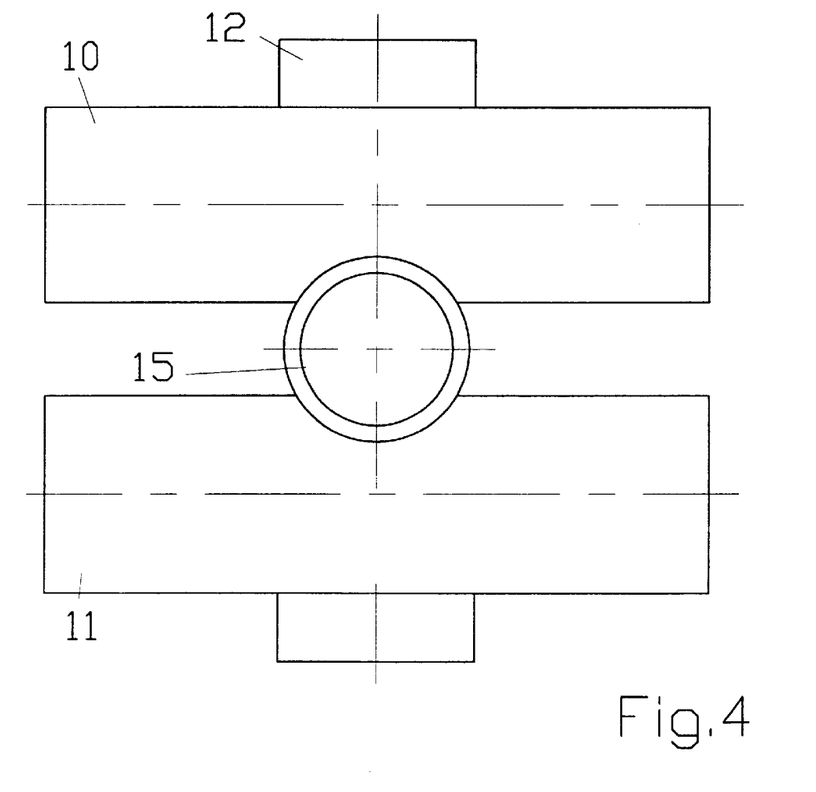
FIG. 4 is a schematic top view of the configuration of FIG. 3.

The cylinders 10 and 11 are two cylindrical cavities parallel to each other horizontally in the cylinder body 1, provided with holes 12 for bear seats of a main bearing bore perpendicularly passing through the walls of the two cylinders at the middle of the cavities. There can be ordinary cylinder liners in the cylinders. There are cylinder heads 13 of an ordinary configuration at the two ends of the cylinders and mounted on the cylinder body.

The sliding track 14 is a cylindrical cavity located between the two parallel cylinders and being perpendicular to the two parallel cylinders in the cylinder body 1, the diameter of the cavity being equal to that of the cylinders. The contour of the cross section of the cavity can also be of a quadrangular shape with two pairs of opposite sides being arc line and straight line respectively.

Figure 7:
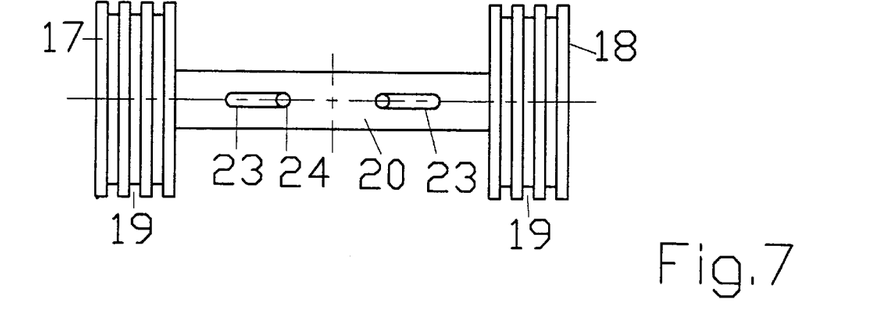
FIG. 7 is a schematic view of the configuration of the double-acting piston in FIG. 1.
Figure 8:
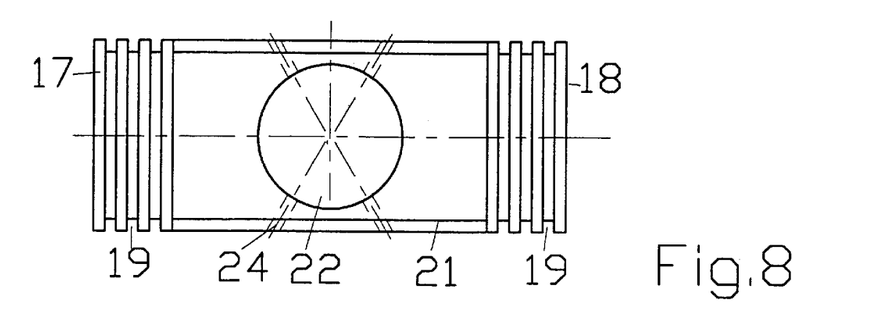
FIG. 8 is a schematic top view of the configuration of FIG. 7.

The pistons 15 and 16, as shown in FIGS. 7 and 8, are ordinary double-acting pistons working on two sides in crowns 17 and 18 at two ends of the pistons there are piston ring grooves 19 for mounting piston rings. The middle sections of the pistons are guide portions 20 presenting a flat rectangular parallelepiped shape, having two guide surfaces 21 in the form of arc-shaped cylindrical surfaces for matching the cylinders, in the center of the guide portion there is a hole 22, on the two symmetric guide surfaces there are four axially cut oil channels, and between the hole and the oil channels there are four oil apertures 24. The pistons 15 and 16 are disposed in cylinders 10 and 11 respectively forming a four-cylinder configuration.

Figure 11:
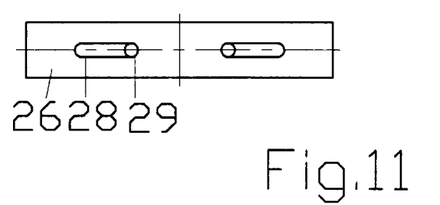
FIG. 11 is a schematic view of the configuration of the dynamic balance sliding piece in FIG. 1.
Figure 12:
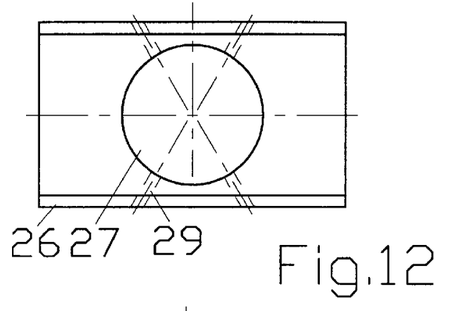
FIG. 12 is a schematic top view of the configuration of FIG. 11.
Figure 13:
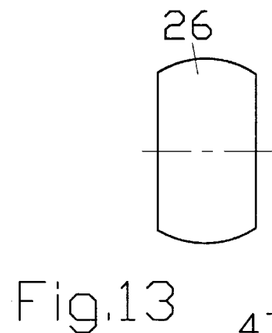
FIG. 13 is a schematic right view of the configuration of FIG. 12.

The dynamic balance sliding piece 25, as shown in FIGS. 11–13, is in a flat rectangular parallelepiped shape, having two guide surfaces 26 in the form of arc-shaped cylindrical surfaces for matching the inner cylindrical surface of the sliding track; in the center of the dynamic balance sliding piece there is a hole 27, on the two symmetric guide surfaces there are four axially cut oil channels 28, and between the hole and the oil channels there are four oil apertures 29. The dynamic balance sliding piece is disposed in the sliding track 14. The mass of the dynamic balance sliding piece is equal to the sum of the mass of the two pistons 15–16, and its centroid is on the central axis.

Figure 20:
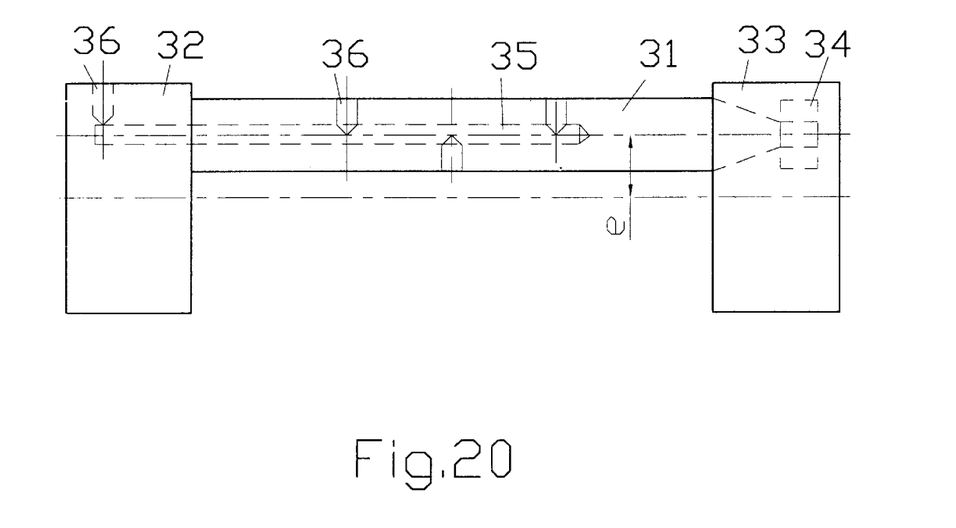
FIG. 20 is a schematic view of the configuration of the crank shaft in FIG. 1 and FIG. 5.

The crankshaft 30, as shown in FIG. 20, presents a single crank configuration, with one end of the crank pin 31 being formed an unit with the main journal 32 at one end of the crankshaft, and the main journal 33 at the other end of the crankshaft being sleeved on the other end of the crank pin 31 and fixedly connected together to form an unit by an ordinary fastener 34, and the crank pin 31 being fully included within the space extending between two main journals 32 and 33, that is, the crank overlap degree being 100%. In the crank pin 31 there is an oil passage 35 along the centerline, having five oil apertures 36 leading to the surface of the main journal 32 and the matching surface of the crank pin 31 which matchs the circular slide blocks. The crankshaft 30 is mounted in the main bear seat holes 12 in the cylinder body.

Figure 14:
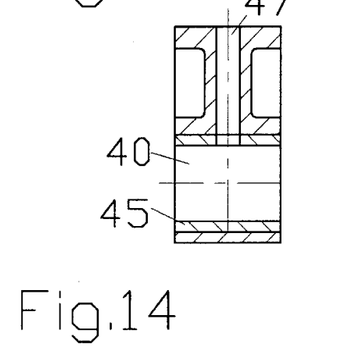
FIG. 14 is a schematic view of the configuration of the circular slide block (that is, the working circular slide block) in the piston of FIG. 1 and FIG. 5.
Figure 15:
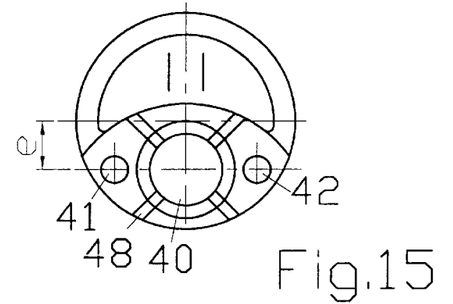
FIG. 15 is a schematic left view of the configuration of FIG. 14.
Figure 16:
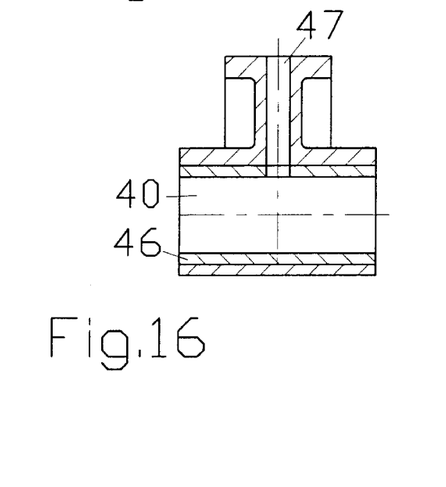
FIG. 16 is a schematic view of the configuration of the circular slide block (that is, the balancing circular slide block) in the dynamic balancing slid block of FIG. 1 and the circular slide block in the dynamic balance sliding piece of the piston type structure of FIG. 5.
Figure 17:
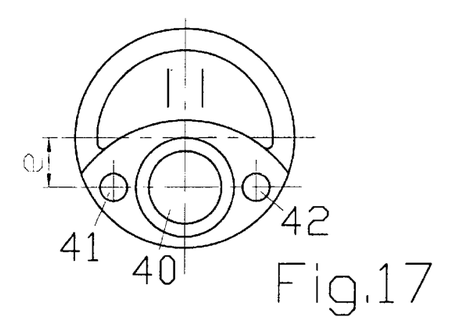
FIG. 17 is a schematic left view of the configuration of FIG. 16.
Figure 18:
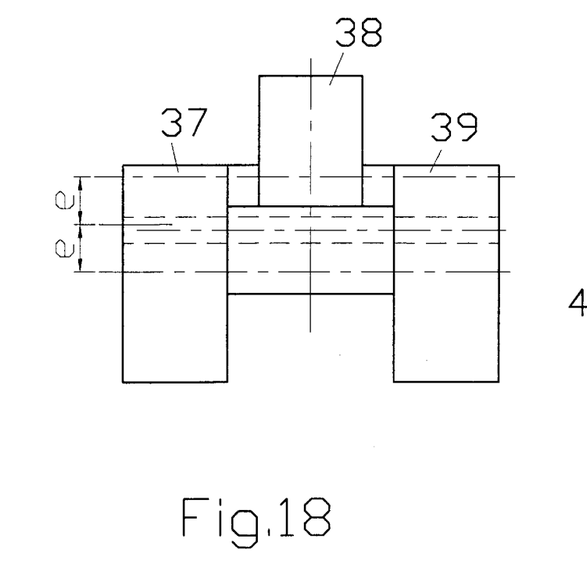
FIG. 18 is a schematic view of the configuration of the integral formed by connecting together the three circular slide blocks of FIG. 1 and FIG. 5.
Figure 19:
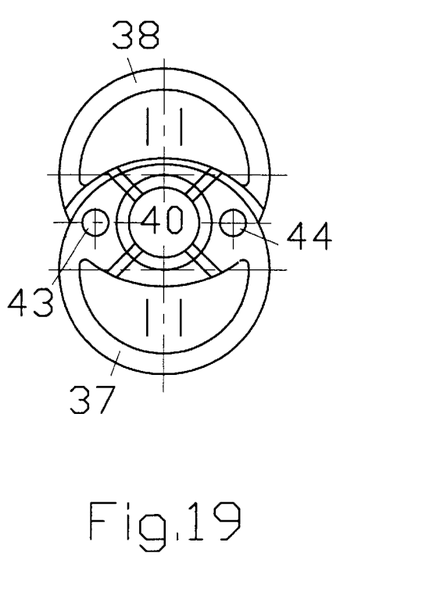
FIG. 19 is a schematic left view of the configuration of FIG. 18.

There are totally three circular slide blocks 37, 38 and 39, with the circular slide blocks 37 and 39, referred to as working circular slide blocks, matching the holes 22 of the pistons 15 and 16 respectively as shown in FIGS. 14 and 15, and the circular slide block 38, referred to as a balancing circular slide block, matching the hole 27 of the dynamic slide block 25 as shown in FIGS. 16 and 17,. All the three circular slide blocks present flat cylinders with equal outer diameters, with the circular slide blocks 37 and 39 being equal in thickness(es) and the circular slide block 38 having a thickness equal to the sum of that of circular slide blocks 37 and 39. In all the three circular slide blocks there are axle-holes 40 with equal eccentricities and equal diameters. In each shaft hole there are fitted with bearing bushes 45 and 46 respectively. On both horizontal sides of the axle-hole there are symmetrically cut out cylindrical pin holes 41 and 42 with equal diameters for fixedly connecting circular slide blocks 37, 38 and 39 one by one to form an unit by two locating pins 43 and 44 in such a manner that the phase difference between circular slide blocks 37 and 38, 38 and 39 is 180°, that is, the adjacent circular slide blocks are in a inverted state in relation to each other and that the axle-holes 40 in the three circular slide blocks are completely coincident. All the axle-holes 40 in the three circular slide blocks have oil passages 47 leading to the outer cylindrical surfaces. At the respective outside faces, that is, faces adjacent to the crank, of the circular slide blocks 37 and 39 there are crossed oil channels 48 connected with the axle-holes 40. The circular slide blocks 37 and 39 are with equal masses and identical centroids; the mass of the circular slide block 38 is the sum of the mass of the circular slide blocks 37 and 39, and its centroid is symmetric with the center of the axle-holes of the circular slide blocks 37 and 39. When assembling, the circular slide blocks 37 and 39 are fitted into the holes 22 of the pistons 15 and 16 respectively, the circular slide block 38 is fitted into the hole 27 of the dynamic balance sliding piece 25, and the crank pin 31 of the crankshaft is inserted into the coincident axle-holes 40 of the integrated three circular slide blocks, thus sleeving all the circular slide blocks onto the crank pin 31. During operation of the internal combustion engine, the pistons reciprocating in the cylinders move the crankshaft to rotate, and the crankshaft drives the dynamic balance sliding piece to reciprocate on the sliding track. This embodiment, being able to convert all the reciprocating inertia forces and centrifugal forces into the rotational centrifugal force concentrated on the crank pin, will achieve excellent dynamic balance.

The two ends of the crankshaft 30 are mounted with a fly wheel 49 and a pulley 50 of conventional configuration respectively. From the fly wheel 49 there is removed an appropriate weight in the direction of the crankshaft center to the crank pin center, and on the pulley there is put some appropriate counterweight in the opposite direction to the weight removed from the fly wheel, so as to enable the crank-and-circular slide block mechanism to achieve static balance.

The operation of the embodiment is the same as that of a conventional internal combustion engine.

The embodiment has been implemented in the manufacture of a ZB-475F Diesel engine, for which the specifications are: cylinder bore D=75 mm, piston stroke S=70 mm, power Ne=25 ps/2400 rpm, the lowest fuel consumption ge=192 g/ps.h, and net weight=65 kg. Compared with the existing engines of the same model, its size is reduced by 55%, the weight reduced by 48%, and fuel consumption lowered by 6%.

The embodiment has also been implemented in the manufacture of a ZB-480 gasoline engine, with D=80 mm, S=60 mm, Ne=32 kw/4000 rpm, ge=262 g/kw.h. Compared with the engines of the same model, its size is reduced by 60%, the weight reduced by 50%, and the fuel consumption lowered by 10%.

The embodiment has been further implemented in the manufacture of a ZB-480 Q gasoline engine, with D=80 mm, S=60 mm, Ne=36 kw/4400 rpm, ge=250 g/kw.h. Compared with the engines of the same model, its size is reduced by 60%, the weight reduced by 50% and the fuel consumption lowered by 11%.

Embodiment 2

Figure 5:
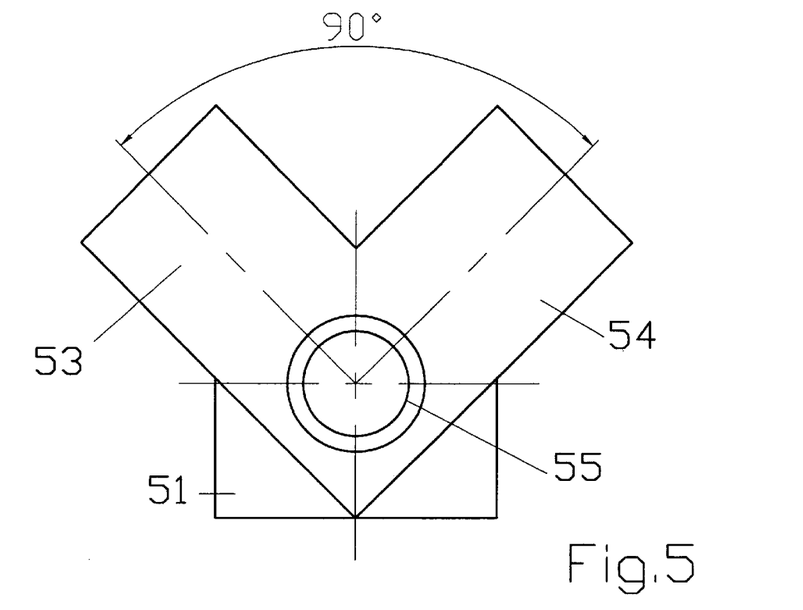
FIG. 5 is a schematic view of the configuration of the cylinder body in a V-shaped three cylinder reciprocating piston type internal combustion engine with a crank and multiple circular slide blocks of the present invention.
Figure 6:
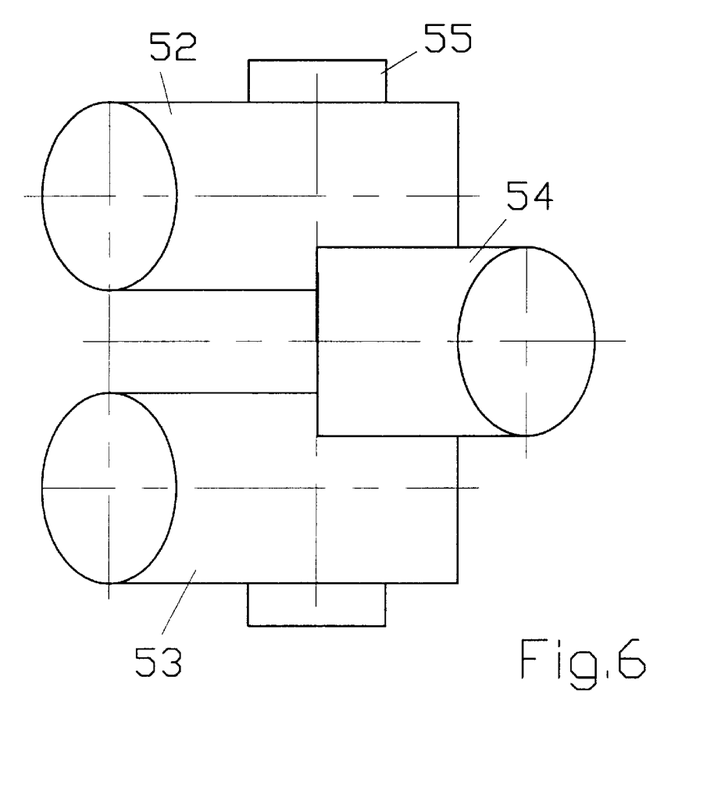
FIG. 6 is a schematic top view of the configuration of FIG. 5.
Figure 9:
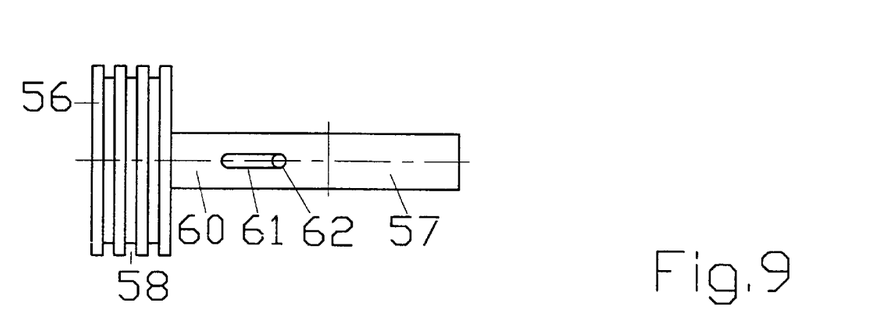
FIG. 9 is a schematic view of the configuration of the single-acting piston in FIG. 5, also of the dynamic balance sliding piece of the piston type structure of the present invention.
Figure 10:
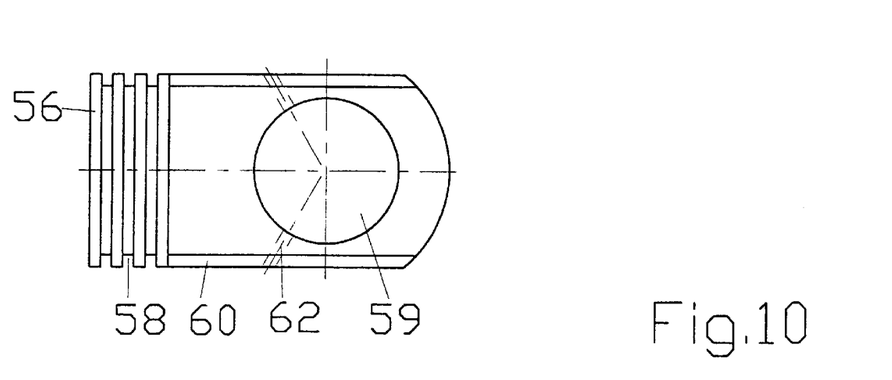
FIG. 10 is a schematic top view of the configuration of FIG. 9.

Another embodiment of the reciprocating piston type internal combustion engine with a crank and circular slide blocks of the present invention, as shown in FIGS. 5, 6, 9, 10 and 14–20, is a V-type three-cylinder engine. The basic structure and operation are substantially the same as embodiment 1. It is characterized in that cylinder body 51, as shown in FIGS. 5 and 6, presents a V-type configuration. Cylinders 52 and 53 are short ones and parallel to each other. Between the two cylinders there is a sliding track 54 perpendicular to them, it has a configuration of short cylinder and is identical in the configuration and dimension to the two cylinders. At two ends of the cylinder body located at the intersection of the cylinders and the sliding track there are bear seats 55 for mounting a crankshaft. The dynamic balance sliding piece matching the sliding track 54 presents a piston type configuration, it and pistons matching the cylinders 52 and 53 are single-acting pistons of identical shapes and sizes, as shown in FIG. 9 and FIG. 10, composed of cylindrical crowns 56 and rectangular parallelepiped like guide portions 57. On the crowns 56 there are piston ring grooves 58 for mounting piston rings, and on the guide portions 57 there are holes 59 for mounting circular slide blocks, and arc-shaped cylindrical guide surfaces 60 on which there are oil channels 61 cut out axially and oil apertures 62 open to the guide surfaces from the holes. The configurations of the three circular slide blocks and the assembly and the others in the embodiment are identical to those in embodiment 1.

On the basis of embodiment 1 of the present invention, a H-⊥ type five-cylinder engine can be obtained by forming the sliding track into a cylinder configuration and the dynamic balance sliding piece into a single-acting piston. On the basis of this five-cylinder engine, a H-⊥ six-cylinder type engine with a total of 4 circular slide blocks can be formed by adding, on either side of the two parallel cylinders, a cylinder parallel to the sliding track and a single-acting piston in the cylinder, as well as a circular slide block in the piston with the circular slide block being also sleeved on the crank pin of the single crank crankshaft. Adopting the formation procedure, a multi-cylinder engine comp(a)rising any number of cylinders with multiple circular slide blocks can be formed.

On the basis of embodiment 2, adopting the formation procedure, a V-type multi-cylinder engine comprising any number of cylinders with multiple circular slide blocks can also be formed.

The configurations of internal combustion engine in the embodiments are only a part of examples of the present invention.

Industrial Applicability

Compared with the prior art, the reciprocating piston type internal combustion engine with a crank and multiple circular slide blocks has the following remarkable advantages and obvious effects.

1. The resultant acceleration in motion of the crank-and-multiple circular slide block mechanism of the present invention is centrifugal acceleration being directed toward the crankshaft center and the crank pin center, for achieving ideal dynamic balance with excellent dynamic balance ability.

2. The present invention utilizes multiple circular slide blocks connected to form an unit to substitute for the connecting rods in a crank-connecting rod mechanism, forming a crank-and-multiple circular slide block mechanism to make the motions of the mutually perpendicularly of pistons and dynamic balance sliding piece(or piston type dynamic balance sliding piece), be interact to accomplish a work-done motion, without adding any other devices, such as a gear transmission pair for the crank-and-single slide block mechanism and to reduce the number of moving parts is reduced, consequently the engine has compact configuration and more reliable operation.

3. The present invention adopts a crank-and-circular slide block mechanism of to substitute for the crank-and-connecting rod mechanism. If given that the crank radius is equal to the eccentricity of the axle-hole in a circular slide block, being e, and the length of the connecting rod is also e, then the piston stroke of the present invention will be 4e, while the piston stroke of a crank connecting rod mechanism will be only 2e. That is, compared with an internal combustion engine with the same piston stroke, the present invention has smaller size and lighter weight, being 30–50% of the existing internal combustion engine of the same type.

4. The multiple-cylinder internal combustion engine comprising the crank-and-multiple circular block mechanism of the present invention utilizes a single crank crankshaft without the need of adopting a multi-crank configuration to make the structure much simpler. Particularly, when the crank radius is equal to the eccentricity of the axle-hole in the circular slide block and the crank pin is included in the extension space of the main journal of the crankshaft, the crankshaft case can be omitted to have the configuration simplified, the machine size reduced, the weight lightened, while ensuring the rigidity and strength of the crankshaft.

5. The present invention can achieve ideal dynamic balance and static balance by adjusting the mass and center of gravity of the moving elements, such as circular slide blocks, pistons, dynamic balance sliding piece as well as components and parts thereof, and the mass distribution and center of gravity of the crankshaft and the flywheel and pulley at its two ends, thus, without adopting any specific structure and devices, balance is achieved, while the configuration being simplified, size reduced and weight lightened correspondingly.

6. The main moving parts in the present invention, such as circular slide blocks, pistons, the dynamic balance sliding piece, the crankshaft and the like, are constituted by cylindrical surfaces and planes, so they have desirable process ability; less material consumption and shorter manufacture period, which account for only 50–60% of that needed for making an existing engine of the same type. Moreover, more than 70% of the elements commonly used in the existing engines of the same type can be used in the engine of the present invention, so it has good inherit ability.

7. The moving parts in the present invention are designed to have lubricating oil passages, oil apertures, and oil channels under pressurized hydraulic lubrication for durable service life and high reliability in use.

8. The structural features of the present invention have enhanced the engine's high mechanical efficiency, high heat efficiency, less pollution exhaust and significant energy saving properties, and performance tests show that the engine's mechanical efficiency is up to 96% and its fuel consumption is reduced by 6–16%.

We claim:

1. A reciprocating piston internal combustion engine with a crank and multiple circular slide blocks comprising a cylinder body, a crank and multiple circular slide block mechanism, a fly wheel, cylinder heads, a valve-actuating mechanism, a fuel supply system, a cooling system and a lubrication system;

said crank and multiple circular slide block mechanism comprises multiple pistons, a crankshaft and a crank, multiple circular slide blocks and at least two pins; wherein each of said pistons is provided with a round hole therein, a work portion is formed on at least one free end of each of said pistons; and each of said circular slide blocks is provided with a round hole and at least two pin holes therein; the outer diameter of said circular slide block is approximately equal to the inner diameter of said round hole of said piston, and said circular slide block is rotatably disposed in said round hole of said piston, wherein the center of said round hole of said circular slide block is offset by a predetermined distance relative to the center of said round hole of said piston, with said predetermined distance being equal to the radius of said crank; said crankshaft is rotatably mounted in said round holes of said circular slide blocks; all of said circular slide blocks are connected together by said pins and fixed relative to each other to form a unit; said crank being disposed on the end of said crankshaft for supporting and balancing the rotation of said crankshaft;

said cylinder body has at least two cylinders arranged in parallel to each other, and at least one sliding track, said sliding track being perpendicular to said cylinders; said cylinder body being provided with bearing holes in a direction transverse to said cylinders and said sliding track respectively; and said pistons are received one in each of said cylinders respectively, and making reciprocating linear motion in said cylinders.

2. The reciprocating piston internal combustion engine according to claim 1, wherein said pistons are single-action pistons, being provided with a work portion at either of free ends of said piston.

3. The reciprocating piston internal combustion engine according to claim 1, wherein said pistons are double-action pistons, being provided with a work portion at each of free ends of said piston.

4. The reciprocating piston internal combustion engine according to claim 1, wherein said round hole is provided at the middle of said piston.

5. The reciprocating piston internal combustion engine according to claim 1, wherein said pistons are dynamic balance sliding pieces without any work portion provided thereon.

6. The reciprocating piston internal combustion engine according to claim 5, wherein said dynamic balance sliding piece has a regular cross-section shape.

7. The reciprocating piston internal combustion engine according to claim 1, wherein the weight of each of said dynamic balance sliding pieces is two times that of said single piston.

8. The reciprocating piston internal combustion engine according to claim 1, wherein said sliding track is a short cylinder.

9. The reciprocating piston internal combustion engine according to claim 1, wherein said sliding track has a regular cross-section shape identical to that of said dynamic balance sliding piece so that said dynamic balance sliding piece slides relative to said sliding track.

10. The reciprocating piston internal combustion engine according to claim 2, wherein said single-action piston makes a reciprocating linear motion in said short cylinder.

11. A reciprocating piston internal combustion engine with a crank and multiple circular slide blocks, comprising a cylinder body, a crank and multiple circular slide block mechanism, a fly wheel, cylinder heads, a valve-actuating mechanism, a fuel supply system, a cooling system and a lubrication system;

said crank and multiple circular slide block mechanism comprises multiple pistons, a crankshaft and a crank, multiple circular slide blocks and at least two pins; wherein each of said pistons is provided with one round hole therein, and a work portion is formed on at least one free end of each of said pistons; each of said circular slide blocks is provided with a round hole and at least two pin holes therein; the outer diameter of said circular slide block is approximately equal to the inner diameter of said round hole of said piston, and said circular slide blocks are rotatably disposed in said round holes of said pistons, wherein the center of said round hole of each of said circular slide blocks is offset by a predetermined distance relative to the center of said round hole of said piston; with said predetermined distance being equal to the radius of said crank; said crankshaft being rotatably mounted in said round holes of said circular slide blocks; all of said circular slide blocks are connected together by said pins and relatively fixed to each other to form a unit; said crank being disposed on the end of said crankshaft for supporting and balancing the rotation of said crankshaft;

said cylinder body having at least two cylinders arranged at a certain angle to each other, and bearing holes in a direction transverse to said cylinder; and said pistons are received one in each of said cylinders respectively, making reciprocating linear motion in said cylinders.

12. The reciprocating piston internal combustion engine according to claim 11, wherein said pistons are a single-action pistons, being provided with a work portion at either of free ends of said piston.

13. he reciprocating piston internal combustion engine according to claim 12, wherein said round hole is provided at one end of said single-action piston.

14. The reciprocating piston internal combustion engine according to claim 1, wherein at least two of said pin holes formed on said circular slide blocks are arranged symmetrically relative to the center of said round holes.

15. The reciprocating piston internal combustion engine according to claim 1, wherein said crankshaft is a single-crank crankshaft, and said circular slide blocks are arranged on the straight free end of said crankshaft at the middle of said crankshaft.

16. The reciprocating piston internal combustion engine according to claim 1, wherein the phase difference between the adjacent ones of said circular slide blocks is 180° respectively.

17. The reciprocating piston internal combustion engine according to claim 12, wherein said pistons are of the equal weight.

18. The reciprocating piston internal combustion engine according to claim 1, wherein both ends of the crankshaft are properly balanced by a counterweight so that said internal combustion engine can keep balance in its entirety.

19. The reciprocating piston internal combustion engine according to claim 2, wherein at least two of said pin holes formed on said circular slide blocks are arranged symmetrically relative to the center of said round holes.

20. The reciprocating piston internal combustion engine according to claim 2, wherein said crankshaft is a single-crank crankshaft, and said circular slide blocks are arranged on the straight free end of said crankshaft at the middle of said crankshaft.

21. The reciprocating piston internal combustion engine according to claim 2, wherein the phase difference between the adjacent ones of said circular slide blocks is 180° respectively.

* * * * *